United States Patent
Letscher (10) Patent No.: US 12,083,974 B2
(45) Date of Patent: Sep. 10, 2024

(54) DEVICE FOR MAINTAINING A HYDRAULIC SUPPLY OF A UTILITY VEHICLE

(71) Applicant: DEERE & COMPANY, Moline, IL (US)

(72) Inventor: Jens Letscher, Albessen (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/192,911

(22) Filed: Mar. 30, 2023

(65) Prior Publication Data
US 2023/0311796 A1 Oct. 5, 2023

(30) Foreign Application Priority Data
Mar. 31, 2022 (DE) .......................... 102022107684.9

(51) Int. Cl.
| | | |
|---|---|---|
| *F15B 13/02* | (2006.01) | |
| *B60R 16/08* | (2006.01) | |
| *B62D 5/30* | (2006.01) | |
| *F15B 1/04* | (2006.01) | |
| *B60T 13/14* | (2006.01) | |

(52) U.S. Cl.
CPC .............. *B60R 16/08* (2013.01); *F15B 1/04* (2013.01); *F15B 13/027* (2013.01); *B60T 13/148* (2013.01); *B62D 5/30* (2013.01); *F15B 2201/205* (2013.01)

(58) Field of Classification Search
CPC ...... F15B 1/04; F15B 13/07; F15B 2201/205; F15B 2201/31; B62D 5/30
See application file for complete search history.

(56) References Cited

U.S. PATENT DOCUMENTS

| | | |
|---|---|---|
| 3,820,620 A | 6/1974 | Miller et al. |
| 3,995,711 A | 12/1976 | Kittle et al. |
| 4,015,681 A | 4/1977 | Shore et al. |
| 4,076,096 A | 2/1978 | Hushower et al. |
| 4,160,490 A | 7/1979 | Bexten et al. |

(Continued)

FOREIGN PATENT DOCUMENTS

| | | |
|---|---|---|
| CN | 211852311 | * 11/2020 |
| DE | 19917210 A1 | 10/2000 |

(Continued)

OTHER PUBLICATIONS

Machine Translation of Abstract CN211852311 (2023).*
European Search Report issued in application No. 23160529.6, dated Jul. 21, 2023, 12 pages.

*Primary Examiner* — Kenneth Bomberg
*Assistant Examiner* — Daniel S Collins (57) ABSTRACT

A device for maintaining a hydraulic supply of a utility vehicle includes a hydraulic pump, which is adjustable in terms of its delivery volume via a pressure control inlet, for feeding hydraulic fluid to a hydraulic circuit, a pressure accumulator that can be charged from the hydraulic circuit via a check valve, a pressure connection between the hydraulic circuit and the pressure control inlet of the hydraulic pump being producible via a sensor line by means of a charging valve, and a supply connection between the pressure accumulator and the hydraulic circuit being producible by means of a discharging valve, by virtue of the check valve being bypassed.

19 Claims, 4 Drawing Sheets

(56) References Cited

U.S. PATENT DOCUMENTS

| | | |
|---|---|---|
| 4,303,089 A | 12/1981 | Gage et al. |
| 4,317,499 A | 3/1982 | Miller |
| 4,326,558 A | 4/1982 | Gage |
| 4,345,660 A | 8/1982 | Miller |
| 5,201,174 A | 4/1993 | Barber et al. |
| 6,935,445 B2 | 8/2005 | Johnson |
| 2012/0085449 A1* | 4/2012 | Barth ........................ F15B 1/04 138/30 |
| 2013/0037340 A1 | 2/2013 | Brinkley et al. |
| 2018/0120185 A1 | 5/2018 | Adeeb |
| 2021/0285465 A1 | 9/2021 | Berkel et al. |

FOREIGN PATENT DOCUMENTS

| | | |
|---|---|---|
| DE | 102013200444 A1 | 7/2014 |
| DE | 102014215567 A1 | 2/2016 |
| DE | 102019000837 A1 | 8/2019 |
| DE | 102020200642 B3 | 3/2021 |

\* cited by examiner

DEVICE FOR MAINTAINING A HYDRAULIC SUPPLY OF A UTILITY VEHICLE

CROSS-REFERENCE TO RELATED APPLICATIONS

This application claims priority to German Patent Application No. 102022107684.9, filed Mar. 31, 2022, which is hereby incorporated by reference.

FIELD OF THE DISCLOSURE

The disclosure relates to a device for maintaining a hydraulic supply of a utility vehicle, including a hydraulic pump, which is adjustable in terms of its delivery volume via a pressure control inlet, for feeding hydraulic fluid to a hydraulic circuit.

BACKGROUND

Utility vehicles include hydraulic circuits having pumps and consumers. The hydraulic circuits can include steering or braking systems.

SUMMARY

A hydraulic circuit is used inter alia in agricultural utility vehicles for supplying energy to various hydraulic consumers, which can include hydraulic steering and braking systems. Here, the devices in question are supplied with pressurized hydraulic fluid from a hydraulic circuit of the utility vehicle, the feed of hydraulic fluid being performed by means of a hydraulic high-pressure pump. In some embodiments, the hydraulic high-pressure pump is a variable-displacement pump, the delivery volume of which can be varied in a manner dependent on a control pressure transmitted to a pressure control inlet (so-called load-sensing system or LS system), such that an adaptation to the actual energy requirement of the hydraulic consumers to which a supply is to be provided is possible.

Since, for example, a hydraulic steering and braking system can generally be manually actuated only with difficulty, or can no longer be manually actuated at all, in the event of a failure of the hydraulic high-pressure pump, some hydraulic systems in agricultural or forestry utility vehicles have an electrically operated auxiliary pump which is supplied with energy from a vehicle battery and which thus allows a redundant supply of hydraulic fluid to the hydraulic consumers in question. In view of the delivery volumes or pressures that must thus be imparted, the use of an electrically operated auxiliary pump is however relatively expensive.

It is therefore an object of the present disclosure to specify a device of the type mentioned in the introduction that can be implemented with relatively little additional expenditure.

This object is achieved by means of a system for maintaining a hydraulic supply of a utility vehicle, having the features of one or more of the following embodiments.

The device for maintaining a hydraulic supply of a utility vehicle comprises a hydraulic pump, which is adjustable in terms of its delivery volume via a pressure control inlet, for feeding hydraulic fluid to a hydraulic circuit, and a pressure accumulator that can be charged from the hydraulic circuit via a check valve, a pressure connection between the hydraulic circuit and the pressure control inlet of the hydraulic pump being producible via a sensor line by means of a charging valve, and a supply connection between the pressure accumulator and the hydraulic circuit being producible by means of a discharging valve, by virtue of the check valve being bypassed.

If the charging valve is opened, then the working pressure presently prevailing in the hydraulic circuit is transmitted via the sensor line to the pressure control inlet of the hydraulic pump. If the hydraulic pump is presently in the standby mode, the working pressure is in the range from 30 to 50 bar. This consequently leads to a pivoting adjustment of the hydraulic pump and an associated increase in the delivery volume in the direction of the hydraulic circuit and thus of the pressure accumulator. Here, the pressure accumulator is filled with hydraulic fluid via the check valve until a maximum delivery pressure that can be imparted by the hydraulic pump is reached. The maximum accumulator pressure that can thus be achieved is approximately 180 to 190 bar. The charging valve is subsequently closed again, and the hydraulic pump returns to the standby mode. Here, the check valve ensures that the maximum accumulator pressure built up during the filling process is maintained in the pressure accumulator.

If the discharging valve is now opened, the hydraulic fluid situated in the pressure accumulator can discharge, bypassing the check valve, into the hydraulic circuit. The supply connection thus produced makes it possible that, even in the event of a failure of the hydraulic pump, at least certain hydraulic consumers of the utility vehicle can continue to be operated, in a manner familiar to the operator, for a limited period of time that arises from the hydraulic energy contained in the pressure accumulator. In the case of the hydraulic steering and braking system, the operator is thus given the opportunity to safely steer the utility vehicle into a suitable parking position and bring it to a standstill there.

Owing to the fact that the hydraulic pump that is provided in any case is used for charging the pressure accumulator, the device according to the disclosure can be implemented with relatively little additional expenditure.

Additional embodiments of the device according to the disclosure are described in the following.

In order to prevent an uncontrolled discharge of the pressure accumulator into the hydraulic circuit when the discharging valve is opened, the supply connection is produced for example via a pressure-limiting element that is arranged between pressure accumulator and hydraulic circuit. The pressure-limiting element is connected in series with the discharging valve within the supply connection. The pressure-limiting element is in some embodiments a throttle valve, which may for example be structurally integrated into the discharging valve.

If it is sought to maintain a specified, that is to say defined, working pressure in the hydraulic circuit, then it is also possible for the pressure-limiting element to be configured as a pressure control valve. The pressure control valve is configured such that a working pressure of approximately 65 bar is assumed in the hydraulic circuit when the discharging valve is open.

The charging valve and/or the discharging valve are for example actuated in a manner dependent on the delivery pressure of the hydraulic pump and/or on the accumulator pressure in the pressure accumulator.

A drop in the delivery pressure can indicate a functional impairment or even a failure of the hydraulic pump. Accordingly, provision may be made whereby the discharging valve assumes an opened position when a specified minimum delivery pressure of the hydraulic pump is undershot. The minimum delivery pressure that is to be maintained is in this case specified as being in the range from 90 to 95% of the working pressure provided in the hydraulic circuit for the standby mode of the hydraulic pump.

Conversely, a need for carrying out a charging operation can be inferred if it is identified that the accumulator pressure and thus the hydraulic energy contained in the pressure accumulator is not sufficient to adequately ensure the operation of the hydraulic consumers. It is consequently conceivable that the charging valve assumes an opened position if a minimum accumulator pressure that is to be maintained for the accumulator pressure is undershot in the pressure accumulator. Here, the minimum accumulator pressure that is to be maintained is specified as being in the range from 80 to 90% of the maximum accumulator pressure in the pressure accumulator.

It is possible here for an actuating device that is electrically and/or mechanically controlled on the basis of a detection of pressure to be provided for opening the discharging valve and/or the charging valve. In the case of an electrically controlled actuating device, a conventional pressure sensor may be used, the signals of which are taken into consideration by a control unit to evaluate and electrically activate a solenoid that is provided for valve actuation purposes. By contrast, if a mechanically controlled actuating device is used, the valve actuation is performed by direct action of pressure on an associated control element.

The pressure accumulator may be a piston-type accumulator that can be preloaded by means of a gaseous operating medium. Piston-type accumulators of this type are distinguished by a compact structural form and are commonly composed of a cylindrical tube formed as a high-pressure vessel, which is closed at its end sides by means of a respective cover. A piston that is displaceable in the cylindrical tube divides the cylindrical tube into a gas space and a liquid space. To preload the piston-type accumulator, pressurized gaseous operating medium, for example nitrogen gas, is fed to the gas space via a first port until a specified prefill pressure is reached. This is performed at the factory or during a workshop visit. If hydraulic fluid is then forced out of the hydraulic circuit via a second port into the liquid space, the piston moves in the direction of the gas space, correspondingly reversibly compressing the gaseous operating medium situated therein. The work performed in the process determines the hydraulic energy that is or can be stored in the piston-type accumulator.

It is pointed out at this juncture that the use of other types of accumulator, for example a bladder-type accumulator or the like, is in principle also conceivable. Owing to the relatively high charging capacity in relation to its compact structural size, a piston-type accumulator is preferred in some embodiments.

From experience, pressurized gaseous operating medium in the gas space of the piston-type accumulator escapes over the course of time owing to leaks. This leads to a gradual decrease in the prefill pressure and thus to a corresponding degradation of the hydraulic energy that is or can be stored. Provision may therefore be made for a control unit to infer a present energy storage capacity of the pressure accumulator in accordance with a prefill pressure detected by sensor means in a specified accumulator state. If a nominal prefill pressure stipulated for the specified accumulator state is undershot, driver information prompted by the control unit via a user interface is output. The driver information may for example be displayed in the form of a text notification on a display of the user interface, and may advise of the need to perform a corresponding pressure correction by replenishing the gaseous operating medium.

The nominal prefill pressure that is to be maintained may in this case relate to an entirely or partially emptied accumulator state of the piston-type accumulator. If complete emptying is typically reserved for a workshop visit for maintenance purposes, partial emptying may in principle also be incorporated into the normal operation of the utility vehicle. In this context, it is for example conceivable for the piston-type accumulator to be discharged to a defined accumulator pressure by virtue of the discharging valve being opened, and for the resulting prefill pressure to be compared with a nominal prefill pressure stipulated for the respective accumulator pressure.

On the other hand, the control unit may also infer a present energy storage capacity of the piston-type accumulator in a manner dependent on charging and/or discharging characteristic curves which are detected by sensor means and which represent the course of the piston position as a function of the prefill pressure, the accumulator pressure and an operating temperature. The present energy storage capacity is then obtained from a comparison of the detected characteristic curves with corresponding nominal characteristic curves, which in turn arise from the specifications of the piston-type accumulator that is used.

Provision may furthermore also be made whereby the control unit infers a present energy storage capacity of the piston-type accumulator by comparing a prefill pressure detected by sensor means with a piston position which is detected by sensor means and which corresponds to the respective prefill pressure. The present energy storage capacity emerges here from an observed incorrect position of the piston relative to a nominal piston position stipulated for the respective prefill pressure.

In order to be able to move the utility vehicle to the nearest workshop in the event of failure of the hydraulic pump even in the case of an insufficiently charged pressure accumulator, provision may be made, in order to realize a tow-away mode, for hydraulic fluid to be able to be fed to the hydraulic circuit via a further check valve, for example from an additional hydraulic supply that is connectable by means of a releasable hydraulic coupling. A switching valve simultaneously produces a connection between a return line of the hydraulic circuit and a reservoir of the additional hydraulic supply in a manner dependent on an identified feed of hydraulic fluid, for example in such a way that the hydraulic fluid quantity contained in the hydraulic circuit of the utility vehicle remains substantially constant. This makes possible, inter alia, an external supply to the hydraulic consumers connected to the hydraulic circuit from a hydraulic pressure source that is present in a towing vehicle.

Instead of using a hydraulic pressure source that is present in a towing vehicle, it is also conceivable to use a manual hydraulic pump to charge the pressure accumulator to such a level that the utility vehicle can be moved onto a low loader for onward transport. The manual hydraulic pump may in this case be fed with hydraulic fluid from a reservoir of the utility vehicle.

The above and other features will become apparent from the following detailed description and accompanying drawings.

BRIEF DESCRIPTION OF THE DRAWINGS

The device according to the disclosure for maintaining a hydraulic supply of a utility vehicle will be described in more detail below on the basis of the appended drawings.

Here, identical reference designations relate to corresponding features or features which are of comparable function. In the drawings.

DETAILED DESCRIPTION

The embodiments or implementations disclosed in the above drawings and the following detailed description are not intended to be exhaustive or to limit the present disclosure to these embodiments or implementations.

Figure 1:
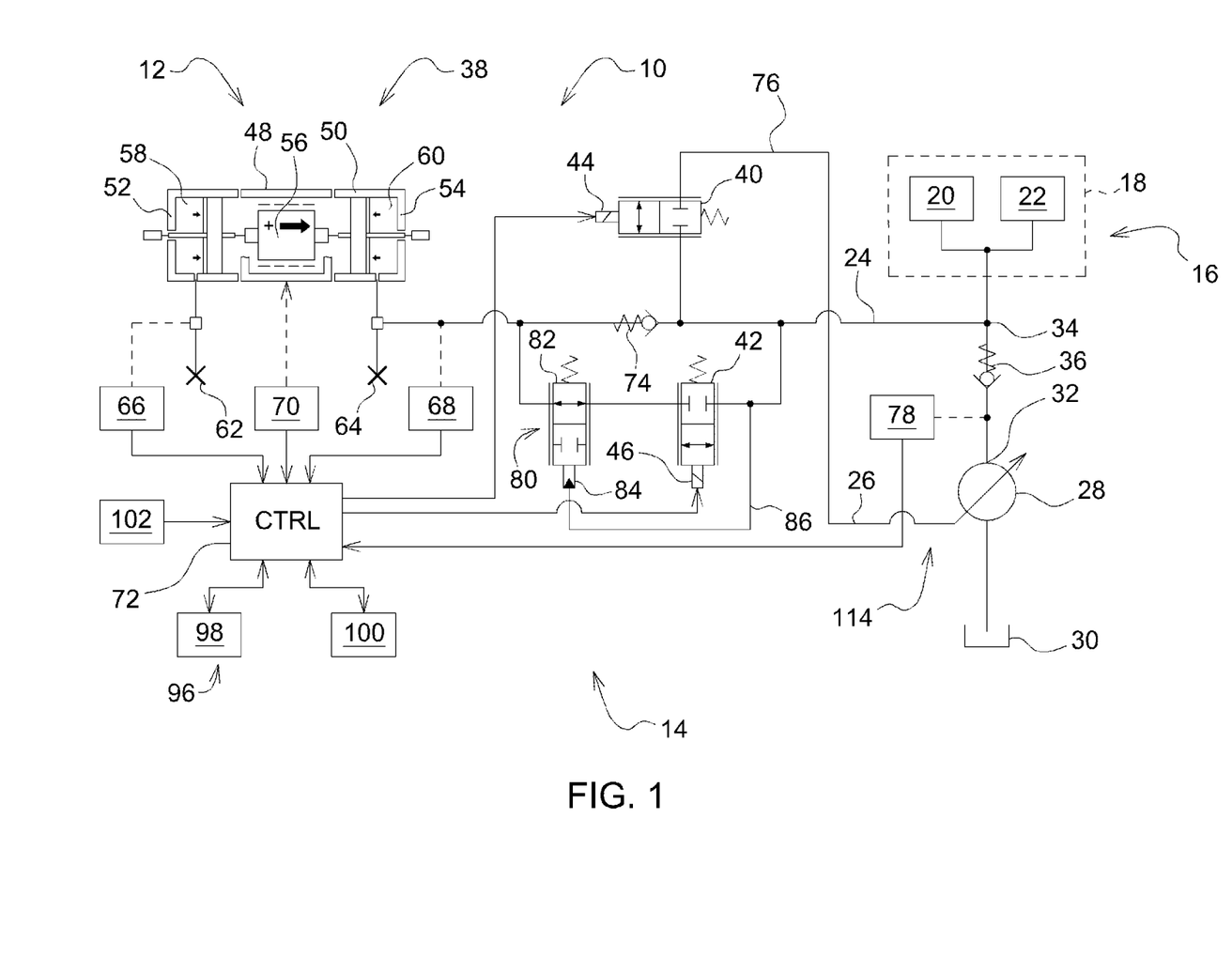
FIG. 1 shows an exemplary embodiment of the device according to the disclosure for maintaining a hydraulic supply of a utility vehicle.

FIG. 1 shows a schematically illustrated exemplary embodiment of the device 10 according to the disclosure for maintaining a hydraulic supply of a utility vehicle 12, in the present case of an agricultural tractor 14 that is not depicted in any more detail.

A hydraulic system 16 comprised by the agricultural tractor 14 serves for providing a supply to various hydraulic consumers 18, including a hydraulic steering and braking system 20, 22. In some embodiments, the hydraulic system 16 comprises a hydraulic circuit 24, which is provided for the operation of the hydraulic consumer 18, and which is fed with hydraulic fluid from a reservoir 30 by means of a hydraulic pump 28, which is adjustable in terms of its delivery volume via a pressure control inlet 26. A first check valve 36 arranged between a delivery outlet 32 of the hydraulic pump 28 and an infeed point 34 of the hydraulic circuit 24 prevents an undesired loss of pressure in the hydraulic circuit 24 in the event of a failure of the hydraulic pump 28. Here, the hydraulic pump 28 is driven by an internal combustion engine (not shown) that is present in the agricultural tractor 14.

Note that further hydraulic elements may also be present in addition to the components illustrated in FIG. 1. However, for ease of understanding, the present description is limited exclusively to the constituent parts required for the function of the device 10.

As can be seen in FIG. 1, the device 10 furthermore comprises a pressure accumulator 38, a charging valve 40, and a discharging valve 42. In the example, the two valves are configured as 2/2 directional valves that can be electrically actuated by means of associated solenoids 44, 46, the valves being closed when electrically deenergized.

The pressure accumulator 38 is a piston-type accumulator 48 that can be preloaded by means of a gaseous operating medium. The piston-type accumulator 48 is composed of a cylindrical tube 50 formed as a high-pressure vessel, which is closed at its end sides by means of a respective cover 52, 54. A piston 56 that is displaceable in the cylindrical tube 50 divides the cylindrical tube 50 into a gas space 58 and a liquid space 60. To preload the piston-type accumulator 48, pressurized gaseous operating medium, in the present case nitrogen gas, is fed to the gas space 58 via a first port 62, until a specified prefill pressure is reached, at the factory or during a workshop visit. If hydraulic fluid is then forced out of the hydraulic circuit 24 via a second port 64 into the liquid space 60, the piston 56 moves in the direction of the gas space 58, correspondingly reversibly compressing the nitrogen gas situated therein. The work performed in the process determines the hydraulic energy that is or can be stored in the piston-type accumulator 48.

Furthermore, a first pressure sensor 66 for detecting the present prefill pressure in the gas space 58, and a second pressure sensor 68 for detecting the present accumulator pressure in the liquid space 60, are provided at the piston-type accumulator 48. An inductive position sensor 70 serves for the contactless ascertainment of the present piston position within the cylindrical tube 50. The sensor signals thus generated are fed to a control unit 72 (e.g., a controller including a processor and memory) for evaluation.

Note that the accumulator volume of the pressure accumulator 38 may also, by contrast to the illustration in FIG. 1, be divided into two piston-type accumulators 48 connected in parallel. This allows not only the use of relatively small and thus inexpensive piston-type accumulators 48, but also better utilization of the installation space available in the agricultural tractor 14.

Charging the Pressure Accumulator

The piston-type accumulator 48 is charged from the hydraulic circuit 24 via a second check valve 74 by virtue of a pressure connection between the hydraulic circuit 24 and the pressure control inlet 26 of the hydraulic pump 28 being produced via a sensor line 76 by means of the charging valve 40.

The charging valve 40 is actuated at the inducement of the control unit 72 in a manner dependent on the present accumulator pressure, detected by means of the second pressure sensor 68, in the liquid space 60 of the piston-type accumulator 48. The control unit 72 infers the need for a charging operation to be carried out if the control unit identifies that the accumulator pressure detected by means of the second pressure sensor 68, and thus the hydraulic energy contained in the piston-type accumulator 48, is not sufficient to adequately ensure the operation of the hydraulic consumers 18. This is the case if a minimum accumulator pressure that is to be maintained for the accumulator pressure is undershot. Here, the minimum accumulator pressure that is to be maintained is specified as being in the range from 80 to 90% of the maximum accumulator pressure in the piston-type accumulator 48.

If this is the case, the charging valve 40 is opened by the control unit 72, by electrical energization of the associated solenoid 44, whilst the discharging valve 42 is closed, which has the effect that working pressure presently prevailing in the hydraulic circuit 24 is transmitted via the sensor line 76 to the pressure control inlet 26 of the hydraulic pump 28. If the hydraulic pump 28 is presently in the standby mode, the working pressure is in the range from 30 to 50 bar. This consequently leads to a pivoting adjustment of the hydraulic pump 28 and an associated increase in the delivery volume in the direction of the hydraulic circuit 24 and thus of the piston-type accumulator 48. Here, the piston-type accumulator 48 is filled with hydraulic fluid via the second check valve 74 until a maximum delivery pressure that can be imparted by the hydraulic pump 28 is reached. The maximum accumulator pressure that can thus be achieved is approximately 180 to 190 bar. The charging valve 40 is subsequently closed again by the control unit 72, and the hydraulic pump 28 returns to the standby mode. Here, the second check valve 74 ensures that the maximum accumulator pressure built up during the filling process is maintained in the piston-type accumulator 48.

Discharging the Pressure Accumulator

If, on the other hand, it is intended to use the hydraulic energy contained in the piston-type accumulator 48 to operate the hydraulic consumers 18, the second check valve 74 is bypassed by means of the discharging valve 42, and a supply connection is thus produced between the liquid space 60 of the piston-type accumulator 48 and the hydraulic circuit 24.

A drop in the delivery pressure can indicate a functional impairment, if not even a failure, of the hydraulic pump 28. Provision is accordingly made for the discharging valve 42 to be actuated at the inducement of the control unit 72 in a manner dependent on the present delivery pressure, detected by means of a third pressure sensor 78, of the hydraulic pump 28. In other words, the discharging valve 42 is opened by the control unit 72 by electrical energization of the associated solenoid valve 46 if the control unit identifies that a minimum delivery pressure, which is to be maintained, of the hydraulic pump 28 has been undershot. The minimum delivery pressure that is to be maintained is in this case specified as being in the range from 90 to 95% of the working pressure provided for the standby mode of the hydraulic pump 28.

If the discharging valve 42 is opened by the control unit 72 whilst the charging valve 40 is closed, the hydraulic fluid situated in the piston-type accumulator 48 can discharge, bypassing the second check valve 74, into the hydraulic circuit 24. The supply connection thus produced makes it possible that, even in the event of a failure of the hydraulic pump 28, at least certain hydraulic consumers 18 of the agricultural tractor 14 can continue to be operated, in a manner familiar to the operator, for a limited period of time that arises from the hydraulic energy contained in the piston-type accumulator 48. In the case of the hydraulic steering and braking system 20, 22, the operator is thus given the opportunity to safely steer the agricultural tractor 14 into a suitable parking position and bring it to a standstill there.

In order to prevent an uncontrolled discharge of the pressure accumulator 48 into the hydraulic circuit 24 when the discharging valve 42 is opened, the supply connection is produced for example via a pressure-limiting element 80 that is arranged between piston-type accumulator 48 and hydraulic circuit 24. The pressure-limiting element is connected in series with the discharging valve 42 within the supply connection.

The pressure-limiting element 80 is in some embodiments a throttle valve, which may be structurally integrated into the discharging valve 42. In the present case, it is sought to maintain a specified, that is to say defined working pressure in the hydraulic circuit 24, and therefore the pressure-limiting element 80 is configured as a pressure control valve 82. The pressure control valve 82 is configured such that a working pressure of approximately 65 bar is assumed in the hydraulic circuit 24 when the discharging valve 42 is open. For this purpose, a pressure control inlet 84 communicates via a dedicated sensor line 86 with the hydraulic circuit 24, bypassing the discharging valve 42.

Figure 2:
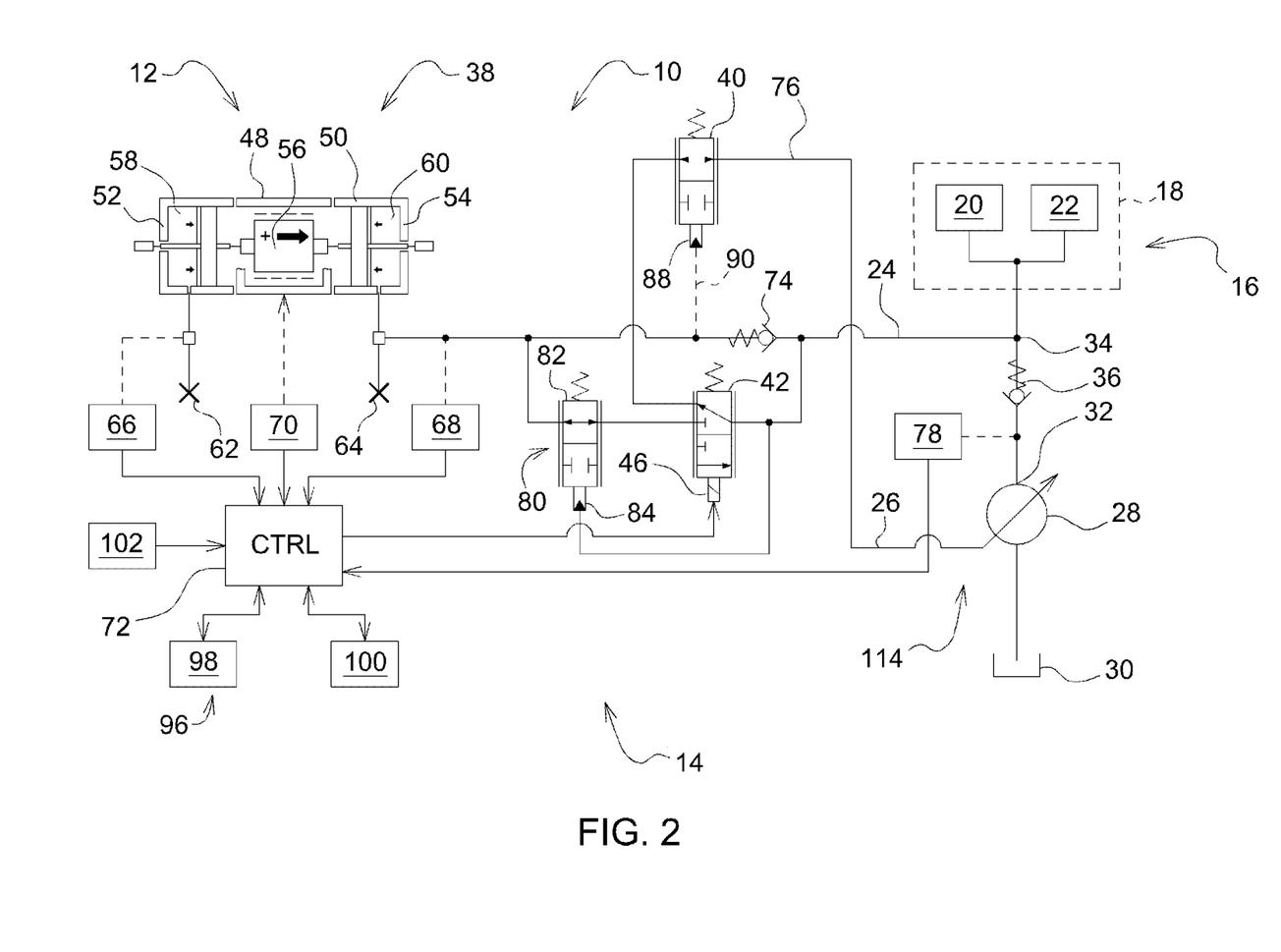
FIG. 2 shows a first structural modification of the device according to the disclosure depicted in FIG. 1.
Figure 3:
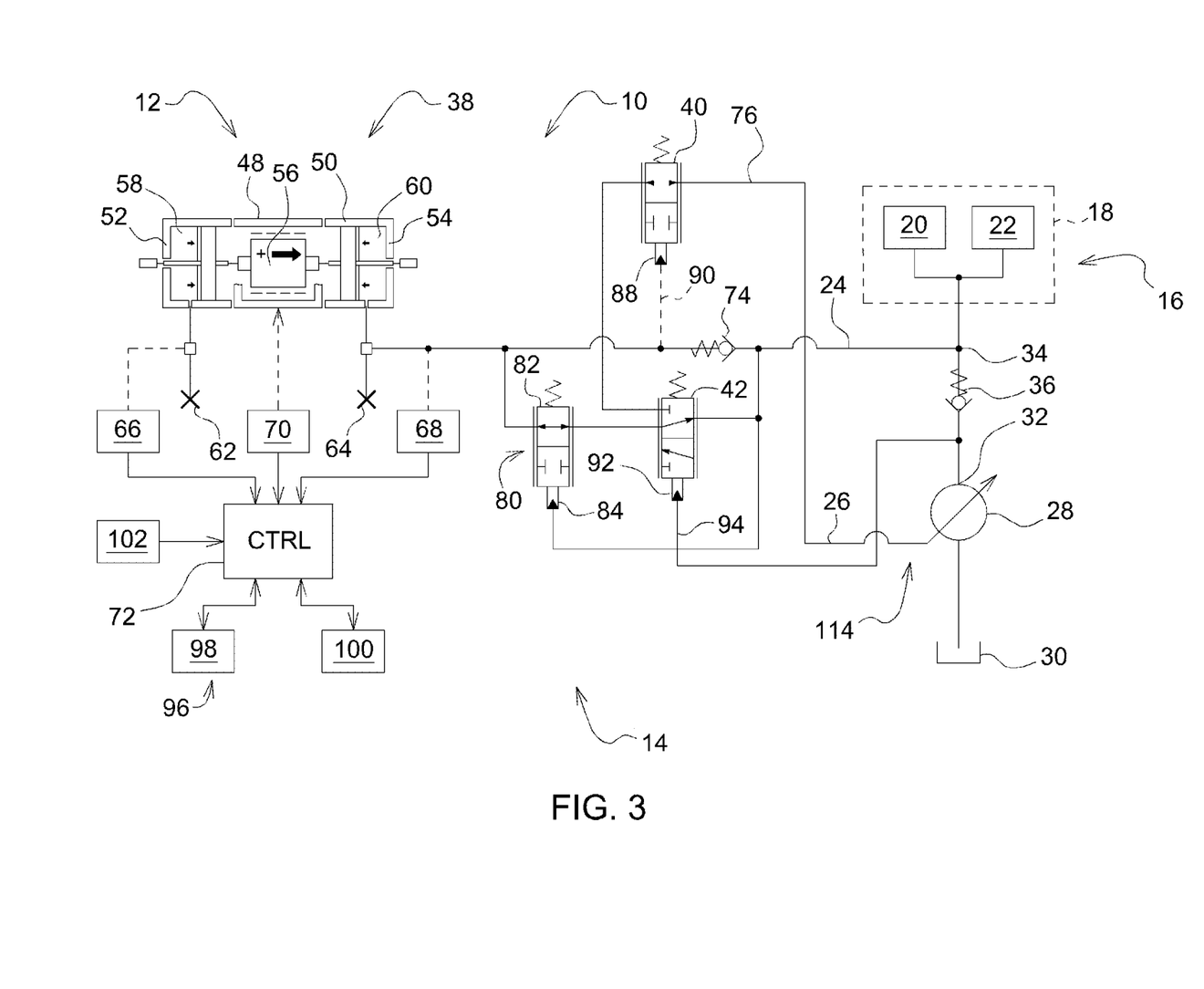
FIG. 3 shows a second structural modification of the device according to the disclosure depicted in FIG. 1.

FIGS. 2 and 3 show optional modifications of the device 10 described above. The function is unchanged in relation to the embodiment illustrated in FIG. 1, but the two modifications differ in terms of the manner in which the charging and discharging valves 40, 42 are actuated.

For example, in the case of the charging valve 40 illustrated in FIG. 2, the valve actuation is performed not electrically, through the use of a solenoid 44, but mechanically, by direct action of pressure on an associated control element 88, which is acted on, via a control line 90, with the accumulator pressure prevailing in the liquid space 60 of the piston-type accumulator 48. As can also be seen, the sensor line 76 of the charging valve 40 is connectable to the hydraulic circuit 24 not directly but via the discharging valve 42, which is now configured as a 3/2 directional valve.

The modification in FIG. 3 additionally provides mechanical valve actuation of the discharging valve 42 instead of the use of the solenoid 46, this being implemented by direct action of pressure on an associated further control element 92 which is connected via a further control line 94 to the delivery outlet 32 of the hydraulic pump 28. The third pressure sensor 78 provided for detecting the delivery pressure is omitted in this case.

Accumulator Diagnosis

From experience, pressurized nitrogen gas in the gas space 58 of the piston-type accumulator 48 escapes over the course of time owing to leaks. This leads to a gradual decrease in the prefill pressure in the gas space 58 and thus to a corresponding degradation of the hydraulic energy that is or can be stored. The assessment of the state of the piston-type accumulator 48 in this regard is performed as part of an accumulator diagnosis performed by the control unit 72. In this regard, it is possible to choose between different approaches.

In some embodiments, provision is made for the control unit 72 to infer a present energy storage capacity of the piston-type accumulator 48 in accordance with a prefill pressure detected by sensor means in a specified accumulator state. If a nominal prefill pressure stipulated for the specified accumulator state is undershot, driver information prompted by the control unit 72 via a user interface 96 is output. The driver information is displayed in the form of a text notification on a display 98 of the user interface 96, and advises of the need to perform a corresponding pressure correction by replenishing the gaseous operating medium.

The nominal prefill pressure that is to be maintained in this case relates to an entirely or partially emptied accumulator state of the piston-type accumulator 48. If complete emptying is typically reserved for a workshop visit for maintenance purposes, partial emptying may in principle also be incorporated into the normal operation of the agricultural tractor 14. In this context, it is for example conceivable for the piston-type accumulator 48 to be discharged to a predefined accumulator pressure by virtue of the discharging valve 42 being opened, and for the resulting prefill pressure to be compared with a nominal prefill pressure stipulated for the respective accumulator pressure.

On the other hand, a (partial) emptying of the piston-type accumulator 48 required for the accumulator diagnosis can be circumvented if the control unit 72 infers a present energy storage capacity of the piston-type accumulator 48 in a manner dependent on charging and/or discharging characteristic curves which are detected by sensor means and which represent the course of the piston position as a function of the prefill pressure, the accumulator pressure and an operating temperature. The present energy storage capacity is then obtained from a comparison of the detected characteristic curves with corresponding nominal characteristic curves, which in turn arise from the specifications of the piston-type accumulator 48 that is used. The specifications are stored in a memory unit 100 that communicates with the control unit 72. The inductive position sensor 70 is used for the detection of the piston position by sensor means, and the first and second pressure sensors 66, 68 are used for the respective detection of the prefill pressure and accumulator pressure by sensor means. The operating temperature is furthermore obtained by detection of an ambient temperature by sensor means using a temperature sensor 102 that is connected to the control unit 72.

Provision may furthermore also be made whereby the control unit 72 infers a present energy storage capacity of the piston-type accumulator 48 by comparing a prefill pressure detected by sensor means with a piston position which is detected by sensor means and which corresponds to the respective prefill pressure. The present energy storage capacity emerges here from an observed incorrect position of the piston 56 relative to a nominal piston position stipulated for the respective prefill pressure. The piston position and the prefill pressure are detected by sensor means using the inductive position sensor 70 and the first pressure sensor 66 respectively.

Tow-Away Mode

Figure 4:
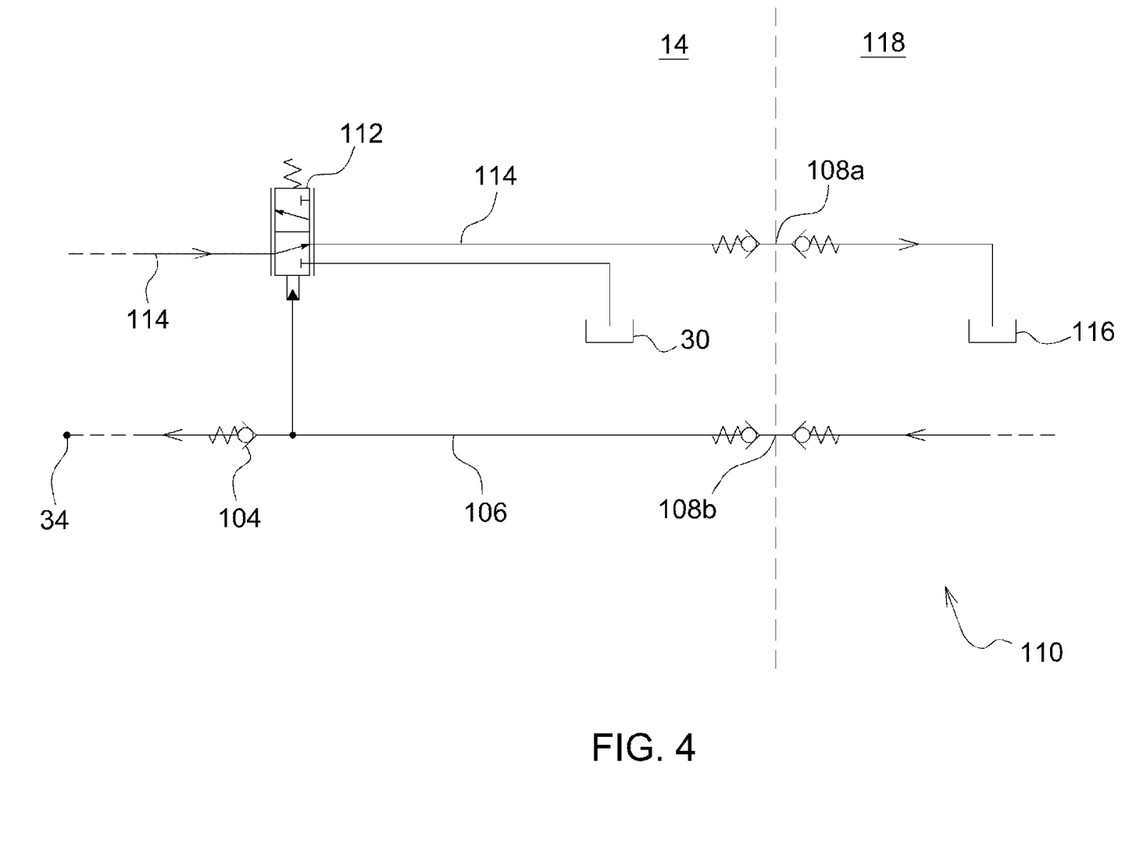
FIG. 4 shows an optional additional circuit for implementing a tow-away mode by connection of an auxiliary hydraulic supply.

In order to be able to move the agricultural tractor 14 to the nearest workshop in the event of failure of the hydraulic pump 28 even in the case of an insufficiently charged pressure accumulator 48, provision may be made, in order to realize a tow-away mode, for hydraulic fluid to be able to be fed to the hydraulic circuit 24 via a third check valve 104 and via an inflow line 106 from an additional hydraulic supply 110 that is connectable by means of a releasable hydraulic coupling 108a, 108b. In some embodiments, the hydraulic fluid is fed via the infeed point 34 of the hydraulic circuit 24. A switching valve 112 simultaneously produces a connection between a return line 114 of the hydraulic circuit 24 and a reservoir 116 of the additional hydraulic supply 110 in a manner dependent on an identified feed of hydraulic fluid, for example in such a way that the hydraulic fluid quantity contained in the hydraulic circuit 24 of the agricultural tractor 14 remains substantially constant. This actuated state of the switching valve 112 is shown in FIG. 4. This makes it possible for the hydraulic steering and braking system 20, 22 that is connected to the hydraulic circuit 24 to be externally supplied with energy from a hydraulic pressure source that is present in a towing vehicle 118. The towing vehicle 118 is for example an agricultural tractor that is not depicted in any more detail.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A device for maintaining a hydraulic supply of a utility vehicle, comprising:
   a hydraulic pump, which is adjustable in terms of its delivery volume via a pressure control inlet, for feeding hydraulic fluid to a hydraulic circuit;
   a pressure accumulator that can be charged from the hydraulic circuit via a check valve;
   a pressure connection between the hydraulic circuit and the pressure control inlet of the hydraulic pump being producible via a charging valve; and
   a supply connection between the pressure accumulator and the hydraulic circuit being producible by a discharging valve, by virtue of the check valve being bypassed;
   wherein hydraulic fluid can be fed to the hydraulic circuit via a further check valve, from an additional hydraulic supply that is connectable by way of a releasable hydraulic coupling, a switching valve simultaneously producing a connection between a return line of the hydraulic circuit and a reservoir of the additional hydraulic supply, in such a way that the hydraulic fluid quantity contained in the hydraulic circuit of the utility vehicle remains substantially constant.

2. The device of claim 1, wherein the supply connection is produced via a pressure-limiting valve that is arranged between the pressure accumulator and hydraulic circuit.

3. The device of claim 2, wherein the pressure-limiting valve is configured as a pressure control valve for providing a specified working pressure in the hydraulic circuit.

4. The device of claim 1, wherein the discharging valve is configured to assume an opened position in response to a specified minimum delivery pressure of the hydraulic pump being undershot as sensed by a pressure sensor.

5. The device of claim 1, wherein the charging valve assumes an opened position if a minimum accumulator pressure that is to be maintained for the accumulator pressure is undershot in the pressure accumulator.

6. The device of claim 1, wherein an actuating device, which is controlled on the basis of a detection of pressure, is provided for opening at least one of the discharging valve and the charging valve.

7. The device of claim 1, wherein the pressure accumulator is a piston-type accumulator that can be preloaded by way of a gaseous operating medium.

8. The device of claim 7, further comprising:
a controller configured to infer a present energy storage capacity of the piston-type accumulator in accordance with a prefill pressure detected by a sensor in a specified accumulator state.

9. The device of claim 7, further comprising:
a controller including a processor and a memory, wherein the memory stores nominal specifications of the piston-type accumulator, and wherein the controller is configured to infer a present energy storage capacity of the piston-type accumulator based on a comparison of a signal detected by at least one sensor with a corresponding one of the nominal specifications of the piston-type accumulator stored in the memory.

10. The device of claim 7, further comprising:
a controller configured to infer a present energy storage capacity of the piston-type accumulator by comparing a prefill pressure detected by a first sensor with a piston position which is detected by a second sensor and which corresponds to the respective prefill pressure.

11. A device for maintaining a hydraulic supply of a utility vehicle, comprising:
a hydraulic pump for feeding hydraulic fluid to a hydraulic circuit, the hydraulic pump having a pressure control inlet, the hydraulic pump configured to be adjustable in terms of its delivery volume;
a pressure accumulator configured to be charged from the hydraulic circuit by way of a check valve;
a pressure connection between the hydraulic circuit and the pressure control inlet of the hydraulic pump, the pressure connection including a charging valve;
a supply connection between the pressure accumulator and the hydraulic circuit, the supply connection including a discharging valve, the supply connection configured to bypass the check valve; and
a controller including a processor and a memory, wherein the memory stores nominal specifications of the pressure accumulator, and wherein the controller is configured to infer a present energy storage capacity of the pressure accumulator by comparing a signal detected by at least one sensor with a corresponding one of the nominal specifications of the pressure accumulator stored in the memory;
wherein the discharging valve is configured to open in response to a detected pressure signal.

12. The device of claim 11, further comprising:
an actuating device configured to open the discharging valve in response to the detected pressure signal.

13. The device of claim 11, wherein the discharging valve is configured to open in response to the detected pressure signal when the detected pressure sensed by a pressure sensor is below a specified minimum delivery pressure of the hydraulic pump.

14. The device of claim 11, wherein the at least one sensor detects
a prefill pressure of the pressure accumulator in a specified accumulator state.

15. The device of claim 11, wherein the at least one sensor includes a first sensor detecting a prefill pressure of the pressure accumulator and a second sensor detecting a piston position, wherein the corresponding one of the nominal specifications includes a nominal piston position stipulated for the prefill pressure.

16. A device for maintaining a hydraulic supply of a utility vehicle, comprising:
a hydraulic pump for feeding hydraulic fluid to a hydraulic circuit, the hydraulic pump having a pressure control inlet, the hydraulic pump configured to be adjustable in terms of its delivery volume;
a pressure accumulator configured to be charged from the hydraulic circuit by way of a check valve;
a pressure connection between the hydraulic circuit and the pressure control inlet of the hydraulic pump, the pressure connection including a charging valve;
a supply connection between the pressure accumulator and the hydraulic circuit, the supply connection including a discharging valve, the supply connection configured to bypass the check valve; and
a controller including a processor and a memory, wherein the memory stores nominal specifications of the pressure accumulator, and wherein the controller is configured to infer a present energy storage capacity of the pressure accumulator by comparing a signal detected by at least one sensor with a corresponding one of the nominal specifications of the pressure accumulator stored in the memory.

17. The device of claim 16, wherein the signal detected by at least one sensor includes a prefill pressure and the corresponding one of the nominal specifications includes a nominal prefill pressure.

18. The device of claim 16, wherein the pressure accumulator is a piston-type accumulator, and wherein the signal detected by the at least one sensor includes a piston position and the corresponding one of the nominal specifications includes a nominal piston position.

19. The device of claim 18, wherein the prefill pressure is detected by a first sensor, and wherein the at least one sensor further includes a second sensor configured to detect a piston position.

* * * * *